May 27, 1969　　　　E. ORSHANSKY, JR　　　　3,446,093
SPLIT-TORQUE HYDROMECHANICAL TRANSMISSION
Filed May 19, 1967　　　　　　　　　　　　　　　Sheet 1 of 8

FIG_1

FIG_3　　　　FIG_4

INVENTOR.
ELIAS ORSHANSKY, JR.
BY
Owen, Wickersham & Erickson
ATTORNEYS

FIG_5

FIG_6

FIG_7

FIG_8

FIG_9

FIG_10

FIG_14

FIG_11

HYDRAULIC POWER AS A % OF ENGINE POWER

FIG_12

EFFICIENCY - %

FIG_13

United States Patent Office 3,446,093
Patented May 27, 1969

3,446,093
SPLIT-TORQUE HYDROMECHANICAL TRANSMISSION
Elias Orshansky, Jr., San Francisco, Calif., assignor to URS Corporation, San Mateo, Calif., a corporation of California
Filed May 19, 1967, Ser. No. 639,771
Int. Cl. F16h *47/04*
U.S. Cl. 74—687          28 Claims

ABSTRACT OF THE DISCLOSURE

This split-torque transmission uses two planetary gear sets and a set of clutches to transfer power from an input shaft to an output shaft. In the first planetary gear set, the sun gear (or other input member) is rotated by the input shaft, and the planet gear carrier (or other output member) rotates with the output shaft. A first clutch controls engagement of the input shaft and the planet gear carrier of this first set, to provide, during such engagement, direct drive of the output shaft by the input shaft. A first auxiliary shaft carries the second planetary gear set, whose sun gear (or other input member) rotates therewith and is in engagement with the ring gear (or other reaction member) of the first set. A first hydraulic motor-pump unit is controlled by a first swash plate and rotates with the first auxiliary shaft, and the unit has means for controlling the first swash plate to place the first hydraulic unit into operation selectively as a motor, as a pump, and as neither. A second auxiliary shaft has a gear thereon in engagement with the ring gear (or other reaction member) of the second planetary set. A third auxiliary shaft is in line with the second auxiliary shaft and has a pinion gear thereon, and a second clutch enables engagement of the second and third auxiliary shafts. A second hydraulic motor-pump unit is controlled by a second swash plate and rotating with the third auxiliary shaft, and has a means for controlling the second swash plate to place the second hydraulic unit into operation selectively as a motor, as a pump, and as neither. A plurality of conduits connect the two motor pump units together. An additional gear mounted on the input shaft engages another gear mounted on the carrier for the planet gears of the second planetary set. A further gear is freely mounted on the output shaft in engagement with the pinion gear, and a third clutch enables locking this further gear to the output shaft or unlocking it therefrom.

There are four modes of forward operation, which blend smoothly from one to the other successively:

(1) The first hydraulic unit is operated as a pump and the second hydraulic unit is operated as a motor, the first and second clutches are disengaged, and the third clutch is engaged; the torque is split.

(2) The second hydraulic unit blocks flow from the first hydraulic unit, the clutches remaining as in (1), and all power is transmitted mechanically via the first planetary gear set.

(3) The second hydraluic unit is operated as a pump, the second clutch is engaged, and the third clutch is disengaged, the first clutch remaining disengaged; the torque is once again split.

(4) The first hydraulic unit blocks flow from the second hydraulic unit, the first and second clutches are engaged and the third clutch remains disengaged, for direct mechanical drive of the output shaft by the input shaft.

Several modifications are presented, some of which omit some parts and the first mode of operation. Others add features.

This invention relates to an improved split-torque hydromechanical transmission, which is infinitely variable continuously through several modes of operation.

My new transmission cruises in direct drive, all the power then being transmitted mechanically and none being transmitted hydraulically. In getting up to cruise speed, a typical transmission of this invention of wide variation of reduction range transmits an average of only about twenty-five percent of the power hydraulically, and even at maximum output torque, only 65% of the power is transmitted hydraulically. It enables a perfect matching of the engine with the transmission, being ideal with both turbine and reciprocating engines.

The invention finds valuable application as a transmission for both trucks and passenger vehicles and other types of vehicles. Unusually high efficiencies are achieved in comparison with all-hydraulic transmissions and prior-art split-torque devices.

In addition to its function as an unusually efficient transmission, my invention also possesses unusual braking advantages. Very low wheel-brake maintenance is achieved by full braking and retarding action of the transmission. It enables complete emergency stops without using the service brakes. Also it provides full hill-holding without engine power.

Beyond these practical features, the transmission of this invention has important structural advantages. It is short, light in weight, inexpensive to manufacture, easily and inexpensively maintained and has a long service life. These features, combined with the high overall fuel-tank-to-wheel efficiency and the outsanding safety features alluded to earlier, provide an outstanding advance over the prior art.

An outstanding feature is that all these effects may be achieved with two small hydraulic pump-motors, two planetary gear sets, and three synchronized clutches, so joined and combined that the transmission progresses from neutral to maximum through four modes—of which the vehicle driver is never aware, because the change is smooth and is completely automatic. Modified forms of the invention add some additional elements or eliminate some.

To summarize briefly a typical embodiment of the invention, there is a first planetary gear set whose sun gear is rotated by an input shaft, and the planet gear carrier rotates with the output shaft. A first clutch enables engagement and disengagement of input shaft and planet gear carrier, to provide, during such engagement, direct drive of the output shaft by the input shaft. A second planetary gear set has a sun gear rotating with a first auxiliary shaft and in engagement with the ring gear of the first set. A first hydraulic motor-pump unit has a swash plate and rotates with the first auxiliary shaft, and there is means for controlling the swash plate to place the unit into operation selectively as a motor, as a pump, and as neither. A second auxiliary shaft has thereon a gear in engagement with the ring gear of the second set, and a third auxiliary shaft is in line with the second auxiliary shaft and has a pinion gear thereon in engagement with a gear mounted freely on the output shaft. A second clutch enables engaging and disengaging the second and third auxiliary shafts, and a third clutch enables locking the last-mentioned gear to the output shaft. A second hydraulic motor-pump unit has a swash plate and rotates with the third auxiliary shaft, and there is means for controlling that swash plate to place the second hydraulic unit into operation selectively as a motor, as a pump, and as neither. Conduits connect said motor-pump units together. An additional gear on the input shaft is in engagement with a gear mounted on the carrier for the second set's planet gears.

In the embodiment of the invention just described, four modes of forward operation blend smoothly from one to the other successively from starting to highest speeds.

(1) The first hydraulic unit is first operated as a pump while the second hydraulic unit is operated as a motor; at this time the first and second clutches are disengaged, and the third clutch is engaged. The torque is thus split into a mechanical path and a hydrodynamic path.

(2) The swash plate of the second hydraulic unit is next set to cause the second hydraulic unit to have zero piston stroke. It then blocks flow from the first hydraulic unit, the clutches remaining as in (1). All power is now transmitted mechanically via the first planetary gear set.

(3) Next, the second hydraulic unit is operated as a pump, the second clutch is engaged, and the third clutch is disengaged, the first clutch remaining disengaged. The torque is again split, though the hydrodynamic path is different than before.

(4) Finally, the swash plate of the first hydraulic unit is set to cause zero piston stroke. The first hydraulic unit then blocks flow from the second hydraulic unit, the first and second clutches are engaged, and the third clutch remains disengaged. Now there is direct mechanical drive of the output shaft by the input shaft. It may be remarked that the first clutch need not be engaged; if it is not, there is an overdrive situation.

Other objects and advantages of the invention will appear from the following description of some preferred embodiments.

The transmission of FIGS. 1–10 includes an input shaft 20 carrying a gear 21 and a sun gear 22 of a first planetary gear set 23. The first planetary gear set 23 has planetary gears 24 carried by a carrier 25, which is secured to an output shaft 26. The planetary gears 24 mesh with the sun gear 22 and also with the internal teeth of a ring gear 27. For this embodiment, the sun gear 22 is used as the input means of the set 23, the carrier 25 is used as its output means, and the ring gear 27 is used as its reaction means. Other arrangements can be used in which different members of planetary gear sets of many types are used to provide the input output, and reaction means (cf. FIG. 13).

Figure 1:
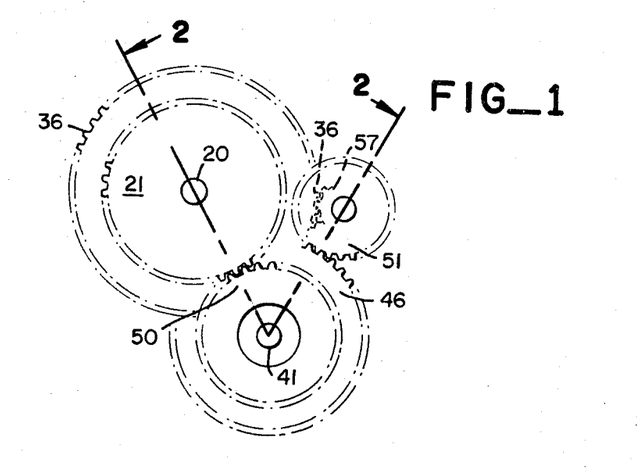
FIG. 1 is an end view in elevation of a transmission embodying the principles of the invention, taken along the arrows 1—1 in FIG. 2.
Figure 2:
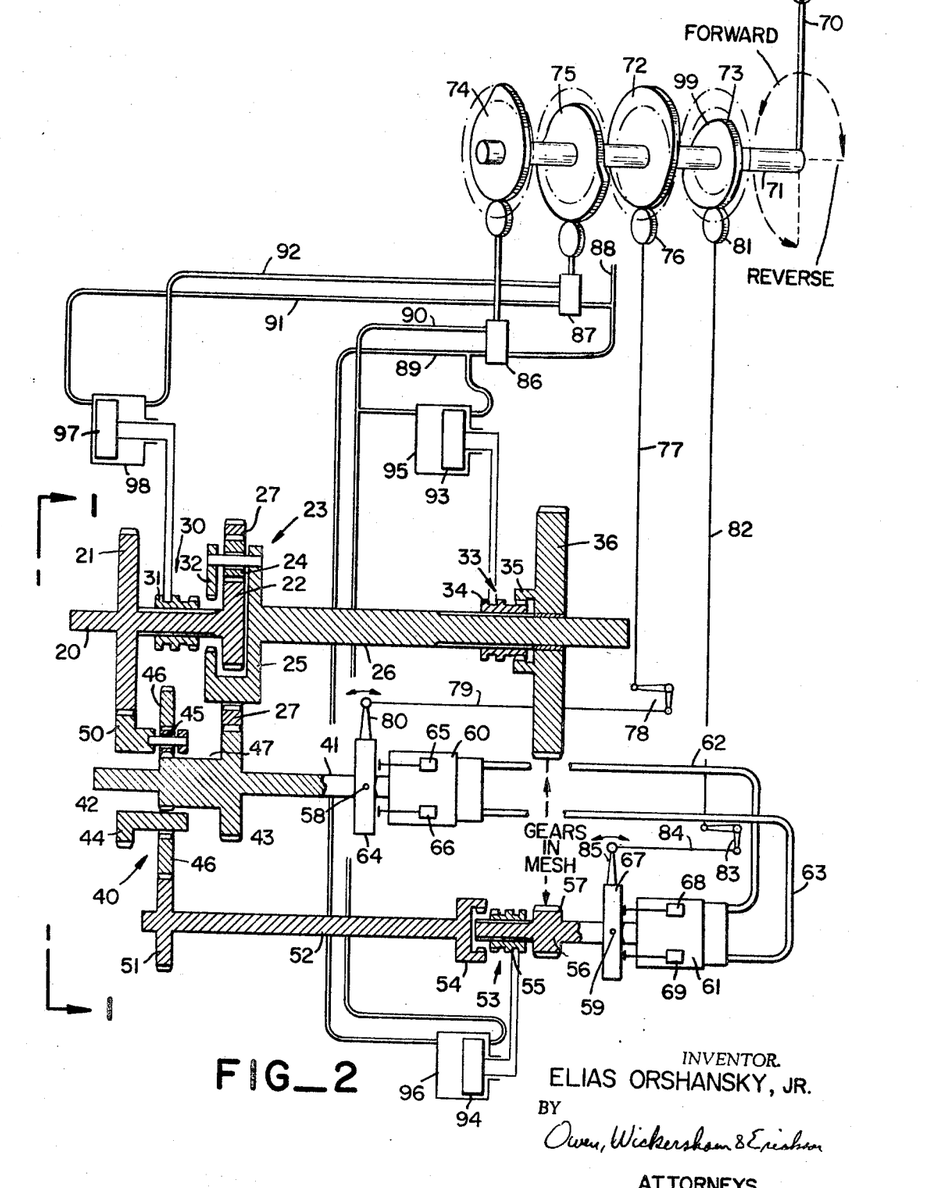
FIG. 2 is an enlarged view in section taken along the line 2—2 in FIG. 1, showing the transmission in neutral. The gears at the right side are necessarily shown out of mesh (though actually they are always in mesh) because of the section line, but this somewhat diagrammatic section is very helpful in seeing the full operation of the transmission. The control system for the clutches and swash plates is illustrated diagrammatically.
Figure 3:
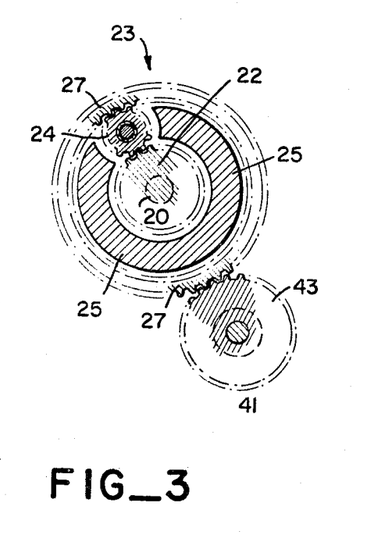
FIG. 3 is a view taken along the line 3—3 in FIG. 5, showing one of the two sets of planetary gears.
Figure 4:
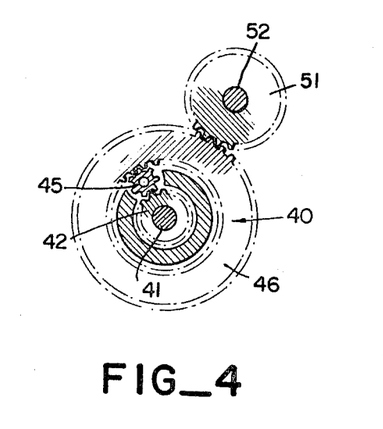
FIG. 4 is a view taken along the line 4—4 in FIG. 5, showing the other set of planetary gears.

A direct-drive clutch 30, comprising a clutch element 31 splined on the input shaft 20 and clutch element 32 on the carrier 23 (or otherwise secured to the output shaft 26) directly connects the input shaft 20 and the output shaft 26, when engaged.

A second clutch 33, called the output gear clutch, comprises an element 34 splined on the output shaft 26 and an element 35 secured to a gear 36 that is mounted for free rotation on the shaft 26. When the clutch 33 is engaged, the output gear 36 is, in effect, locked to the output shaft 26, and when the clutch 33 is disengaged the gear 36 floats on the shaft 26.

A second planetary gear set 40 is mounted on a shaft 41 and includes a sun gear 42 integral with the shaft 41 (or rigidly secured to it), a planetary carrier 44 with planet gears 45, and a ring gear 46. A reaction gear 43 also on the shaft 41 and integral therewith, or rigidly secured to it, engages the ring gear 27 of the first planetary gear set 23. Integral with the planet gear carrier 44 is a gear 50 that engages the gear 21. Once again, the sun gear 42, carrier 44, and ring gear 46 are used respectively as the input, output, and reaction means of the set 40, though other members of planetary gear sets of many types can serve as input, output, and reaction means.

The ring gear 46 of the second planetary gear set 40 engages a gear 51 on a shaft 52. A third clutch 53, the hydraulic unit clutch, has one element 54 on the shaft 52 and an element 55 splined on a shaft 56, which has a gear 57 rigidly mounted thereon. The gear 57 engages the gear 36.

Two hydraulic pump-motors 60 and 61, shown diagrammatically, are provided with conduits 62 and 63 connecting them. A control element, such as a swash plate 64 mounted on the shaft 41 actuates a plurality of pistons, such as pistons 65 and 66 of the pump-motor 60, while a swash plate 67 on the shaft 56 actuates a set of pistons, such as pistons 68 and 69 of the pump-motor 61.

Control of the system and changes from one mode to another may be controlled manually (or automatically) by a lever 70 that turns a shaft 71 rigidly carrying four cams 72, 73, 74, and 75. The cam 72 engages a cam follower 76 to operate a rod 77, bell crank 78, rod 79, and thereby a lever 80 that tilts the swash plate 64 about its pivot 58. Similarly, the cam 73 engages a cam follower 81 to operate a rod 82, bell crank 83, rod 84, and lever 85 to tilt the swash plate 67 about its pivot 59.

The cam 74 controls a valve 86, and the cam 75 controls a valve 87. The valves 86 and 87 are connected in a pneumatic or hydraulic system with a fluid supply 88 and conduits 89, 90, 91, and 92. The conduits 89 and 90 control a pair of pistons 93 and 94 in respective cylinders 95 and 96 which respectively engage and disengage the clutches 33 and 53. Similarly, the conduits 91 and 92 control a piston 97 in a cylinder 98, which engages and disengages the clutch 31.

The lever 70 is moved by the operator in response to timing and feel, or it may be replaced by or controlled by an automatic or computer-controlled device. The cams 72 and 73 act continuously, while the cam 74 actuates the valves 87 and 88 from one definite position to another, only once for each in the cycle. As explained later, the same lever 70 controls reverse.

FIGS. 2 and 5–10 illustrate the essential operating features of the drive. Below middle lockout the hydraulic unit 60 acts as a reaction for the ring gear 27 of the primary planetary set 23, and above middle lockout it acts as a motor to add speed to the ring gear 27. The three clutches 30, 33 and 53 engage and disengage only when the speeds of its components are matched, and they transmit no power at the time of their initial engagement.

FIG. 2 shows the transmission in neutral with no braking. Both hydraulic units 60 and 61 are on zero stroke, the output gear clutch 33 is engaged, and the other two clutches 30 and 53 are disengaged. In this configuration, no restraint is offered to any member of either planetary set 23 or 40, and the input shaft 20 is free to rotate whether the output shaft 26 is restrained or not. The shafts 20 and 26 are free to rotate independently of each other.

To bring the transmission out of neutral, the lever 70 is moved to increase, first the stroke of the hydraulic unit 61, and then that of the hydraulic unit 60 (FIG. 5) by acting on the swash plates 64 and 67. This affords restraint to the ring gear 27 of the primary planetary 33, which then serves to transmit power hydraulically (the central hydraulic unit 60 acting as a pump, and the lower unit 61 acting as a motor (and adds torque to the output shaft 26. When the two hydraulic units 60 and 61 are at maximum stroke, the primary planetary ring gear 27 is rolling backward (relative to the direction of input and output motion) at the proper rotational speed to provide the maximum reduction ratio required (in the case at hand, approximately 9:1). Note that there are two transmission paths: a direct mechanical path 110 (solid line) through the primary planetary set 23 from the input shaft 20 to the output shaft 26, and a hydraulic path 111 (dash line) that adds torque to the output, passing from the input shaft 20 to the shaft 41 which drives the hydraulic unit 60 and then through the conduits hydraulic power is delivered to the unit 61, turning the gear 57 and sends power to the output shaft 26 through the gear 36, the clutch 33 being engaged. At the point for transmission of maximum torque, that is, with the stroke of both hydraulic units at a maximum (the condition shown in FIG. 5), approximately 65% of the input power is transmitted hydraulically. This is the first mode of transmission used when starting and at low speeds.

Figure 6:
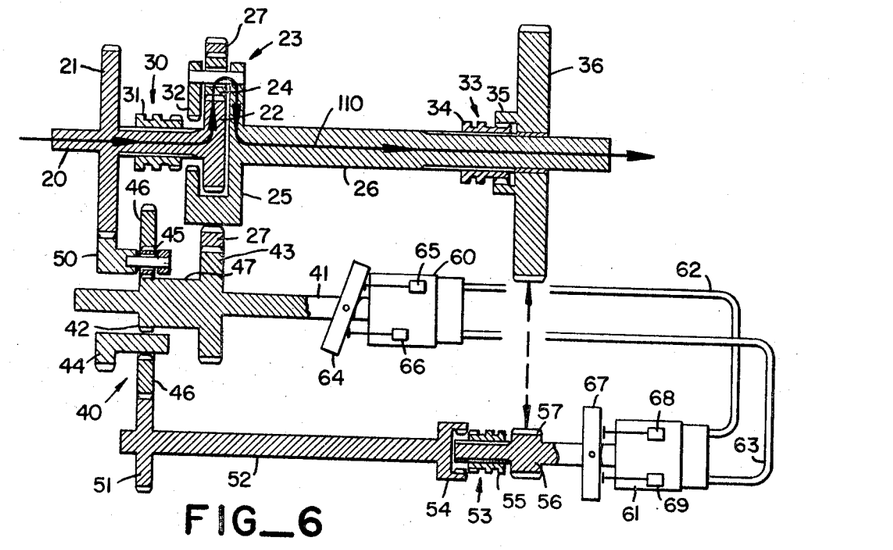
FIG. 6 is another view similar to FIG. 2, showing the transmission in its second mode of power-transmission, called "mid-range lockout." The control system for the clutches and swash plates are omitted to save space.

To reduce the ratio, the stroke of the lower hydraulic unit 61 is reduced, until the condition shown in FIG. 6, with the stroke of this unit 61 at zero, is attained. At this point, the primary planetary ring gear 27 is totally restrained and is stationary, and the central hydraulic unit 60 can then pump no fluid through the lower unit. The transmission ratio then becomes that of the primary planetary 23 (in this case approximately 3:1), *and all power is transmitted mechanically* along the solid line 110. This, the second mode of power transmission, is termed the "mid-range lockout" and affords efficient power transmission at mid-range road speeds, here approximately 23 m.p.h. Typically, it may be used for going up steep hills.

At this point, when the output shaft 26 and output gear 36 are rotating at the same speed, and no power is being transmitted through the output gear 36, the output clutch 33 is disengaged and the hydraulic unit clutch 53 is engaged, again, no power is being transmitted. The ratios of the secondary planetary set 40 and that of its ring gear 46 to the gear 51 on the lower shaft 52 with which it is meshed, are so chosen that the shaft 52 rotates the gear 57 at the same speed as it would be rotated by the gear 36 at mid-range lockout only.

Figure 7:
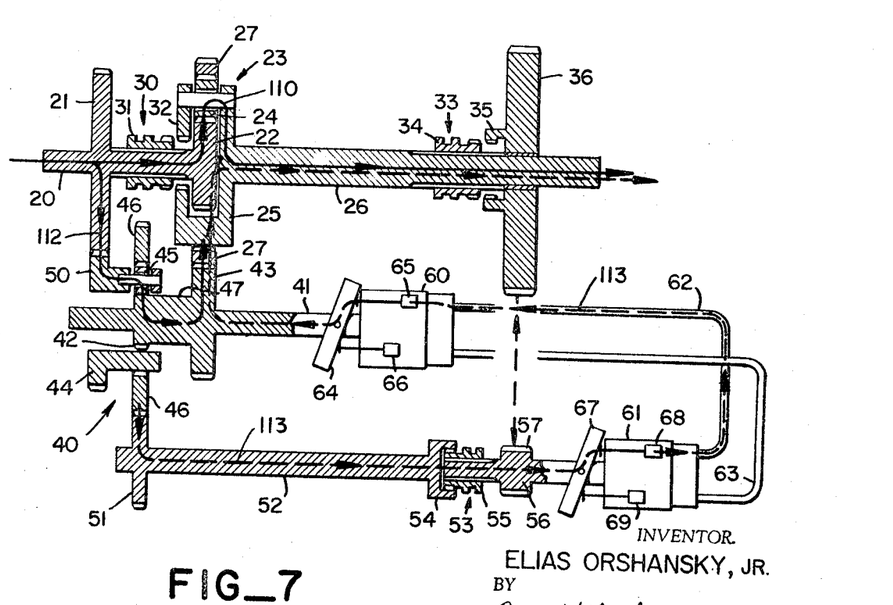
FIG. 7 is a view similar to FIG. 6 showing the transmission in the third mode of power-transmission, the high range between middle lockout and top lockout.

In order to increase the speed of the output shaft 26 above that at which it runs at mid-range lockout, the stroke of the lower hydraulic unit 61, which is now acting as a pump driven by the input 20 through the planetary gear 40, is increased. When it reaches its maximum, as shown in FIG. 7, the maximum amount of power in this third transmission mode is being transmitted hydraulically. For the 9:1 ration range illustrated, this amounts to approximately 30% of input power. These changes are done so smoothly that the driver does not know that they are occurring.

There are now three power transmission paths: The first is the mechanical path 110, which transmits directly through the primary planetary set 23. The second path 112, also shown in solid lines, is also a mechanical path; it takes a portion of the input torque and transmits it through the gear 50, the carrier 44, the sun gear 42, and the reaction gear 43 of the secondary planetary set 40 to the ring gear 27 of the primary planetary 23. The third path 113, shown in broken lines, takes the remaining torque abstracted from the input and, through the ring gear 46, the gear 51, and the shafts 52 and 56 (the clutch 53 being engaged in this mode, while the clutches 30 and 33 are disengaged), drives the lower hydraulic unit 61, is transmitted hydraulically by the conduits to the center unit 60 (now acting as a motor), and thereby serves to increase the speed of rotation of the ring gear 27 of the primary planetary set 23. By this means, the output rotational speed is increased over what it was when the primary planetary ring gear 27 was held stationary at mid-range lockout. In other words, a portion of the input torque is used to increase output speed. The ring gear 27 now rotates in the same direction as the input 20 and the output 26.

Figure 8:
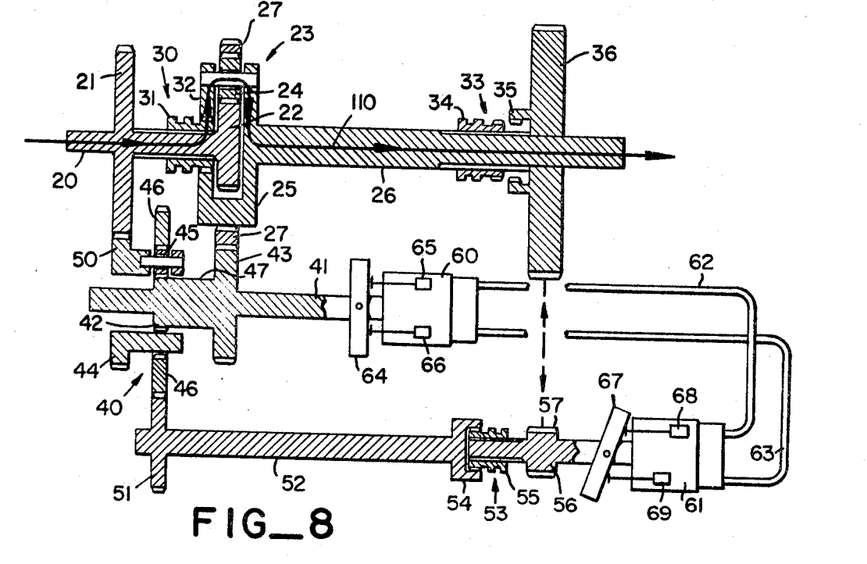
FIG. 8 is another view similar to FIG. 6, showing the transmission in its fourth mode of power transmission, "top lockout."

To decrease the transmission numerical ratio below that shown in FIG. 7 (for higher speed), the stroke of the central hydraulic unit 60 is decreased until the condition illustrated in FIG. 8 is attained, with zero stroke on the central hydraulic unit 60. The lower hydraulic unit 61 can therefore pump no fluid; so the ring gear 46 of the secondary planetary set 40 is restrained, and the secondary planetary sun gear 42 drives the primary planetary ring gear 27 at the same rotational speed as that of the input 20, through proper choice of gear ratios, which is also the same as that of the output 26.

In this condition, with the sun gear 22 and the ring 27 of the primary planetary set 23 rotating at the same speed, its carrier 25 also rotates at that speed, and the primary planetary set 23 is acting as a straight shaft; so it can be effectively made a straight shaft by engaging the direct drive clutch 30 which locks the input shaft 20 to the output shaft 26 (FIG. 8). This highly efficient direct drive condition is the fourth mode of transmission operation. This is used for top speeds and for about 90% of highway driving.

The ring gear 27 of the primary planetary set 23 can be made to rotate faster than the sun gear 22, in which case a still lower ratio than direct drive obtains; that is, the transmission is in an overdrive condition.

Figure 9:
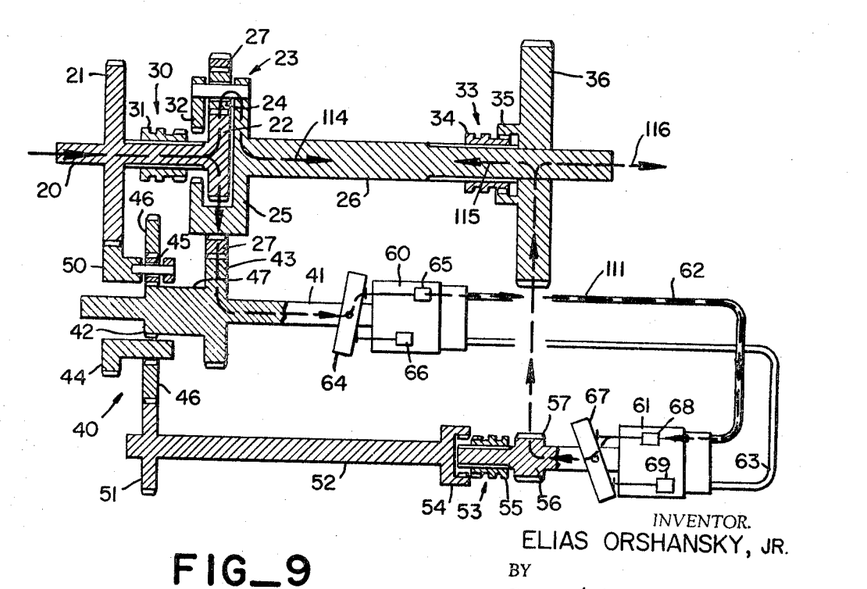
FIG. 9 is yet another view like FIG. 6, showing the transmission in reverse.

With reference to FIG. 9, reverse is accomplished in the following way: The torque delivered by the engine to the shaft 20 tends to drive the planetary set 23 in the same direction as the engine rotation, and through the reaction of the gear 27, the hydraulic unit 60, acting as a pump, is driven in the same manner as in FIG. 5. However, for purposes of reversing the vehicle, the swash plate 64 is set on a much smaller angle, as shown in FIG. 9. Therefore, the unit 60 delivers higher pressure with a given torque input than when the swash plate 64 is set at full angle. This pressure is delivered, as by means of conduit 62, to the hydraulic unit 61, which acts as a motor and supplies its torque to the gear 36. The swash plate 67 of the hydraulic motor 61 is in a reverse position relative to that shown in FIGS. 5, 7, and 8, so that the unit 61 rotates the gear 36 in a direction opposite to the rotation of the shaft 20 and opposite to the torque delivered to the shaft 26, by the planetary set 23 and shown by an arrow 114 in FIG. 9. The hydraulic unit 61 delivers torque to the shaft 26, as indicated by an arrow 115 large enough not only to move the vehicle (by torque indicated by arrow 116) but also to overcome the torque at 114, and to drive the planetary set 23 backwards.

In split-torque drives, this operation is called "regenerating the power." It accomplishes the purpose of driving the vehicle in a reverse direction, where efficiency is not of consequence. The control to accomplish this has to be supplied in addition to the ratio control previously described in connection with FIGS. 2 and 5. The control to accomplish the reverse mode is brought about by the same set of cams 72, 73, 74, and 75 that regulate the forward ratio of the transmission, with the handle 70 moved in the opposite direction from the forward movement. When the handle 70 is move in this opposite direction for reverse, the cam 72 with which the cam follower 76 is associated has a smaller rise than when it is going forward, which puts the unit 60 on a smaller displacement. At the same time, the cam 73 associated with the cam follower 81 is so shaped with a low portion 99 that the position of the swash plate 67 is reversed. The cams 74 and 75 are shaped so that they make no change in the position of the valves 86 and 87 from what they were in "neutral." In order to make the reverse arrangement simpler to illustrate, only a 90-degree motion of the lever 70 is indicated for reverse, whereas 180° is indicated for the full forward operation.

Figure 10:
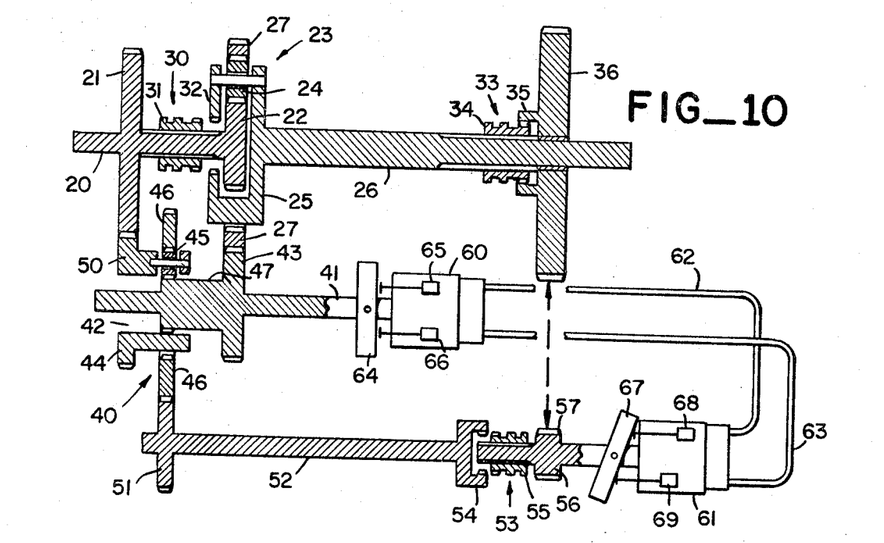
FIG. 10 is still another view similar to FIG. 6, showing the transmission in neutral and used as a parking brake.

A neutral parking, braked mode is shown in FIG. 10. Here the clutch 33 is engaged and the clutches 30 and 53 are disengaged. The output shaft 26 is totally restrained because the stroke of the central hydraulic unit 60 is zero, while the unit 61 is pumping, the input shaft 20 is free to rotate.

Figure 11:
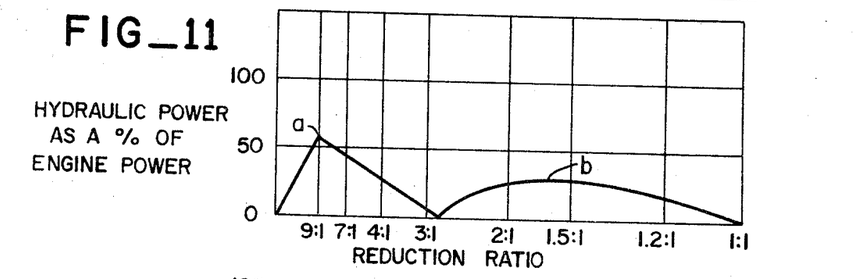
FIG. 11 is a diagram of hydraulic power as a percent of engine power for the transmission of FIGS. 1–10.

The effects of the four forward operational modes in terms of percent of power transmitted hydraulically at various reduction ratios are shown in FIG. 11. At the maximum reduction ratio of 9:1, at the peak *a* some 65% of horsepower is transmitted hydraulically, while comparable prior-art units, which for maximum reduction ratio operate as a pure hydrostatic unit, transmit 100% of the power hydraulically. A second but lower peak *b* in the curve occurs at a ratio of approximately 1.7:1, where approximately thirty percent of the power is transmitted hydraulically. A second but larger power peak occurs in a comparable prior-art device at a ratio of approximately 4:1, where 150% of the power is transmitted regeneratively. At the lowest reduction ratios, the unit of this invention is in direct mechanical drive with no power transmitted hydraulically; a comparable prior-art unit which does not have a mechanical lockout at its highest ratio is then transmitting approximately 40 percent of the power hydraulically.

Figure 12:
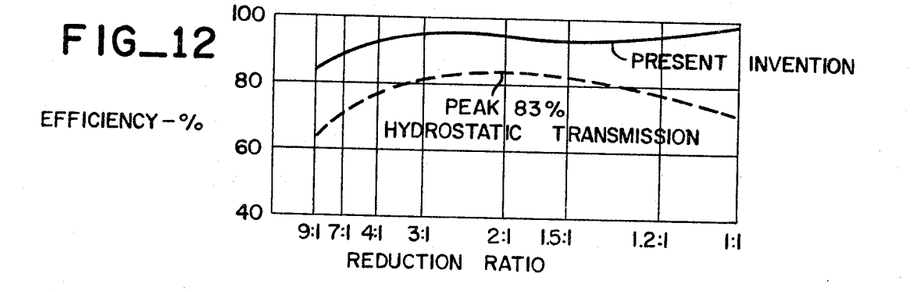
FIG. 12 is an efficiency diagram comparing the transmission of this invention to a straight hydrostatic transmission.

FIG. 12 shows how the efficiency curve of the transmission of this invention (solid lines) is above that of a typical hydrostatic transmission (broken lines) at all times; in fact only at one point, at the 9:1 ratio, is the efficiency of the unit of this invention as low as the *highest* efficiency of the hydrostatic transmission. Generally, the efficiency is well about 90%. The unit of this invention operates efficiently over the entire reduction range.

Thus the transmission of this invention is an infinitely variable four-mode transmission whose major components are two small pumps 60 and 61, two planetary gear sets 23 and 40, and three dog clutches 30, 33, and 53. For use with a typical 200-horsepower engine, it is short (approximately 12 inches long), weighs less than 200 lbs., has a low initial cost (approximately $1,000) and has low maintenance costs and long service life, because its hydraulic units are operated well within their ratings. Most important, it has high overall fuel-tank-to-wheel efficiency, and outstanding safety features.

Among the more important operating features described, is the fact that it can cruise in direct mechanical drive (i.e., with no power transmitted hydraulically). In getting up to cruise speed, it transmits an average of only 25% of power hydraulically, and even at maximum output torque transmits no more than 65% power hydraulically. It can develop full braking and retarding, and it is ideally suited to operation with both reciprocating engines and turbines. Of especial importance is the fact that it provides for complete emergency stops *without use of service brakes,* it has full hill holding *without engine power,* and permits perfect matching of transmission and engine.

Figure 14:
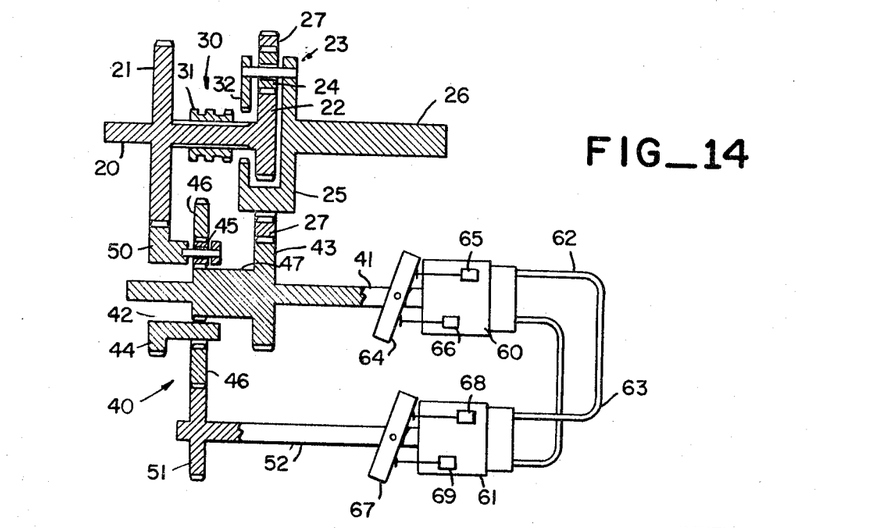
FIG. 14 is a view similar to FIG. 7 of a modified form of the invention having two fewer clutches and doing all of its torque multiplication through the planetary gear sets.

FIG. 14 shows a modified form of the device, which is really a simplified three-mode transmission. Every element in it is also present in the form of the invention shown in FIGS. 1–10, and every element is given the same number except two—the output shaft 26a of this embodiment and the shaft 52a. There is no output gear 36, no clutch 33, no gear 57 and no clutch 53. This means that the first mode of the preceding embodiment does not occur, but the other three forward modes and the reverse action are identical to what has been described. Lacking the first mode of the other embodiments, this embodiment has less starting power and less power for steep hills, but such power is not needed by passenger vehicles, or light trucks. The embodiment of FIG. 14 is less expensive than that of FIGS. 1–10 and is capable of inexpensive mass production. It also occupies less space and is lighter.

Figures 15, 16:
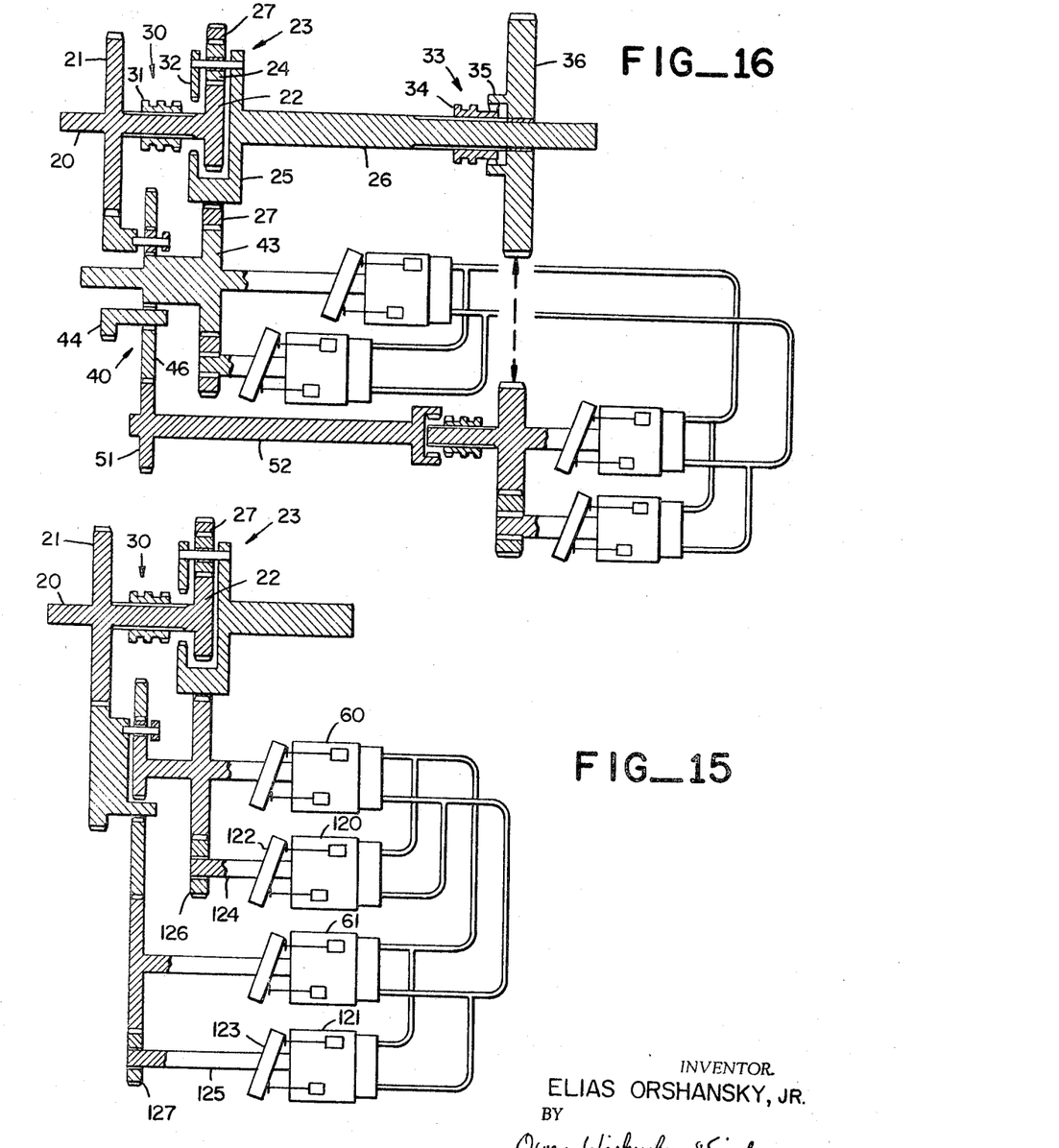
FIG. 15 is a view similar to FIG. 14 of another modified form of the invention having additional hydraulic motors.
FIG. 16 is a view similar to FIG. 15 of another modified form of the invention combining the structures of FIGS. 15 and 5.

FIGS. 15 and 16 show how overriding clutches may be applied to the transmission of this invention to give some advantageous results. The device of FIG. 15 is like that of FIG. 14 with the addition of two hydraulic units 120 and 121, with control units 122 and 123 controlled by the same device controlling the units 64 and 67, mounted on shafts 124 and 125. The shaft 124 is connected to the reaction gear 43 by an overriding clutch 126, and the shaft 125 is connected to the gear 51 by an overriding clutch 127.

In operation, the practical effect of the unit 121 is that during the mode of operation between starting and mid-range lockout more torque is supplied initially, being geared more, about twice the gear ratio of the equivalent device of FIG. 14, and for the same reason the transmission reaches its top speed in this mode, and then, at that speed, the overrunning clutch drops out further effects of this unit 121. At the beginning, in other words, both units 61 and 121 drive, until the overrunning clutch 127 drops out the unit 121.

Similarly, the effect of the unit 120 is past mid-range lockout, when the unit 120 adds its drive to the unit 60 and increases the speed more quickly until the higher speed is reached and the overrunning clutch 126 drops the unit 120 out.

Figure 5:
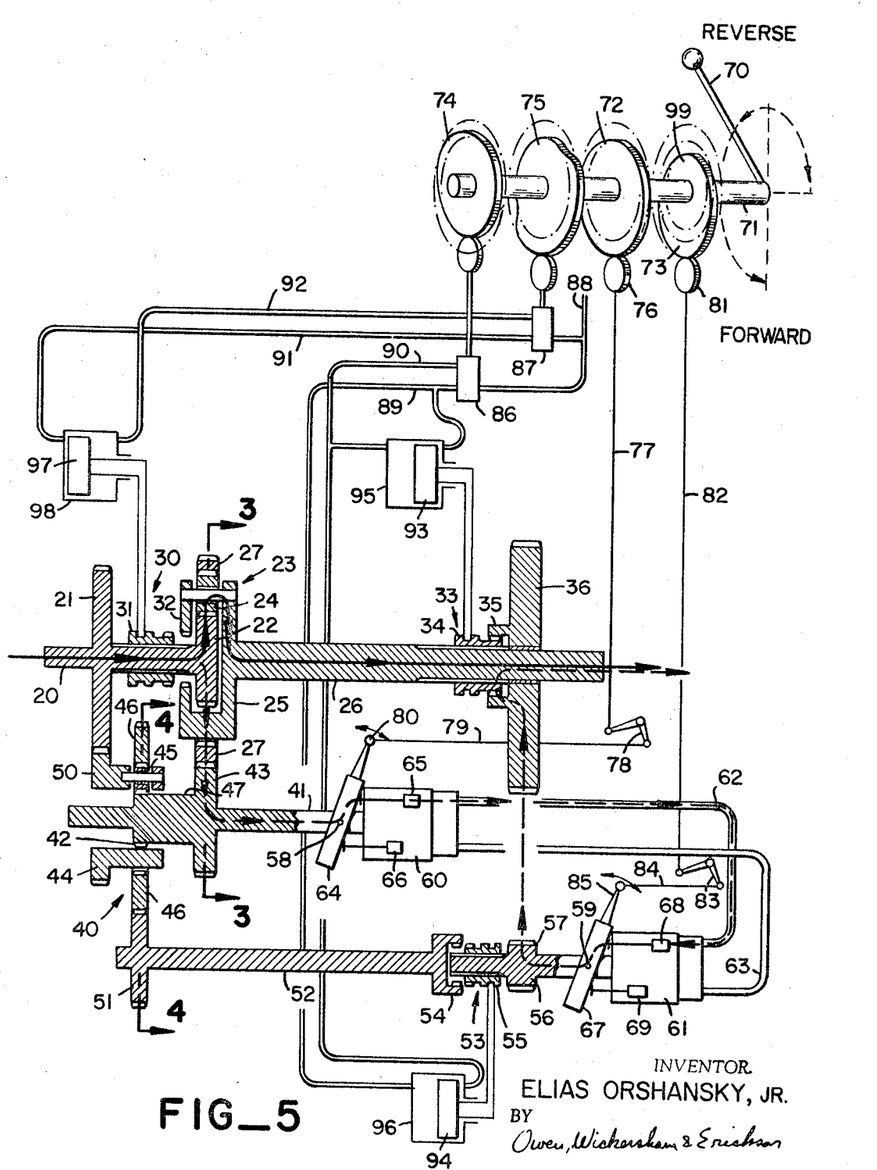
FIG. 5 is a view similar to FIG. 2, showing the transmission in its first power-transmission mode, the low-speed range.

The transmission of FIG. 16 is like that of FIGS. 5 and 15 combined, and the overriding clutches have the same effect as in FIG. 15. The only difference in connection of these units is that the overrunning clutch 127 engages the gear 56 instead of the gear 51.

Figure 13:
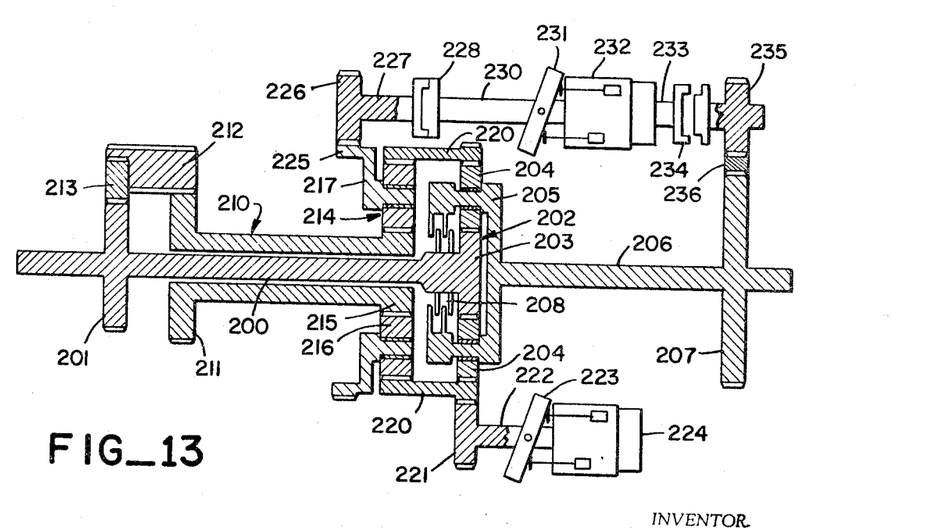
FIG. 13 is a view similar to FIG. 5 of a modified form of the invention having basically the same type of operation.

A modified form of the invention is shown in FIG. 13. Basically, the operation is the same as that for the device of FIGS. 1 through 10, but the individual elements are somewhat rearranged, and mechanically present a different apperance.

An input shaft 200 is provided with a gear 201 and extends to a first planetary gear set 202 having a sun gear 203 which is in mesh with planet gears 204. A planet carrier 205 is secured to an output shaft 206, which also carries a gear 207 thereon. A clutch 208 is provided for direct engagement between the input shaft 200 and the planetary carrier 205.

Coaxial with the input shaft 200 is another hollow shaft 210 having a gear 211 which is driven by a gear 212, which, in turn, is driven by a gear 213 from the gear 201. The shaft 210 at its opposite end supports a second planetary set 214, including a sun gear 215 secured to the shaft 210 and engaging planetary gears 216, which are supported by a planetary carrier 217.

The planetary gears 204 of the first planetary set 202 and the planetary gears 216 of the second planetary set 214 engage the same ring gear 220. The ring gear 220 is in engagement with a pinion gear 221 on a shaft 222, which carries a swash plate 223 that operates a hydraulic unit 224.

The planetary carrier 217 also carries a gear 225 that engages a gear 226 on a shaft 227. The shaft 227 is connectible by a clutch 228 with a shaft 230 carrying a swash plate 231 which operates a hydraulic unit 232. The hydraulic unit 232 is on a shaft 233 which is engageable by means of a clutch 234 with a gear 235, which is in engagement with a gear 236, which, in turn, is in engagement with the gear 207 on the output shaft 206.

Although the configuration is somewhat different from that of the unit heretofore described, the operation is substantially identical. In other words, the first planetary set 202 has as its input means the sun gear 203 driven directly by the rotary input shaft 200. The output means for the set 202 is the planetary carrier 205 which directly drives the output shaft 206, and the reaction means for the set 202 is the ring gear 220. The second planetary set 214 has as its input means the sun gear 215, which is driven directly by the shaft 200 through the gears 201, 213, 212, and 211. The output means is the ring gear 220, and the reaction means for the second planetary set is the carrier 217.

In the FIG. 13 structure, the hydraulic lines and controls are not shown, but the two hydraulic units 224 and 232 are connected together with hydraulic conduits, exactly as in the previous units described. The conduits are omitted here solely for the sake of overall clarity in the drawing. The hydraulic unit 224 is analogous to the hydraulic unit 60 and is operatively connected in driving relation to the reaction means of the planetary set 202, which is the ring gear 220. The second hydraulic unit 232 can be operatively connected in driving relation to the reaction means of the second planetary set 214, through the clutch 228 and the gears 226 and 225, or to the output shaft 206 through the clutch 234 and the gears 236, 235, and 207. Again, the swash plates independently vary the magnitude and direction of displacement of each hydraulic unit. The clutches and swash plates operate exactly as in the form of the invention which has already been described in FIGS. 1 through 10. For example, with the clutch 228 engaged and with the swash plates 231 and 223 set to cause both hydraulic units 232 and 224 to have a non-zero displacement, as shown in FIG. 13, the structure is in that mode of operation marked b in FIG. 11.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A split-torque transmission for use with a rotary input means and a rotary output means, including in combination:
 a first planetary set having input means driven directly by said rotary input means, output means directly driving said rotary output means, and reaction means which supplies reaction for the drive of said rotary output means,
 a second planetary set having input means also driven directly by said rotary input means, output means operatively connected in driving relation to the reaction means of said first planetary set, and reaction means,
 first and second hydraulic units connected together by hydraulic lines, said first unit being operatively connected in driving relation to said reaction means of said second planetary set, said second unit being operatively connected in driving relation to said reaction means of said first planetary set, and
 means for independently varying the magnitude and direction of displacement of each said hydraulic unit.

2. The transmission of claim 1 having clutch means for connecting and disconnecting the rotary input means to the output means of said first planetary set.

3. The transmission of claim 1 having clutch means for connecting and disconnecting two of the means of said first planetary set.

4. The transmission of claim 1 wherein said means for independently varying comprises a single system having means for varying continuously from a first mode wherein said second hydraulic unit is inoperative by virtue of being set for zero displacement, to a second mode wherein said first hydraulic unit is operated as a motor and said second hydraulic unit is operated as a pump, to a third mode where said first hydraulic unit is inoperative.

5. The transmission of claim 4 having clutch means for connecting two of the means of said first planetary set and wherein in said first and second modes said clutch is disengaged and in said third mode said clutch is engaged.

6. The transmission of claim 1 having first clutch means for connecting and disconnecting the rotary input means to the output means of said first planetary set, a first gear associated with said rotary output means, second clutch means for connecting and disconnecting said first gear to said rotary output means, a second gear associated with said reaction means of said second planetary set and in engagement with said first gear and third clutch means for connecting and disconnecting a driving relation between said second gear and said reaction means of said second gear set.

7. A split-torque transmission for use with an input shaft and an output shaft, including in combination
 a first planetary gear set including a first sun gear rotated by said input shaft, a first planetary carrier carrying a first set of planet gears and rotating with said output shaft, and a first ring gear,
 a first auxiliary shaft having a pinion gear secured thereto and engaged with said first ring gear,
 a second planetary gear set including a second sun gear, a second planet carrier carrying a second set of planetary gears, and a second ring gear, said second sun gear rotating with said first auxiliary shaft and thereby connected to said first ring gear,
 a first hydraulic motor-pump unit having a plurality of pistons and a first swash plate and rotating with said first auxiliary shaft and thereby connected to said first ring gear,
 means for controlling said first swash plate to place said first hydraulic unit into operation selectively as a motor, as a pump, and as neither,
 a second auxiliary shaft having a gear mounted thereon in engagement with said second ring gear,
 a second hydraulic motor-pump unit having a plurality of pistons and a second swash plate and rotating with said second auxiliary shaft,
 means for controlling said second swash plate to place said second hydraulic unit into operation selectively as a motor, as a pump, and as neither,
 a pair of conduits connecting said first and second motor-pump units together,
 a first additional gear mounted on said input shaft, and
 a second additional gear mounted on said second carrier and in engagement with said first additional gear.

8. The transmission of claim 7 having both said means for controlling included in a single system having means for varying continuously from a first mode wherein said second hydraulic unit is inoperative, to a second mode wherein said first hydraulic unit is operated as a motor and said second hydraulic unit is operated as a pump, to a third mode where said first hydraulic unit is inoperative.

9. A split-torque transmission including in combination
   an input shaft,
   an output shaft,
   a first planetary gear set including a first sun gear rotated by said input shaft, a first planet carrier carrying a first set of planet gears and rotating with said output shaft, and a first ring gear,
   clutch means for engaging and disengaging said input shaft and said first planet carrier and therefore providing, during such engagement, direct drive of said output shaft by said input shaft,
   a first auxiliary shaft having a pinion gear secured thereto and engaged with said first ring gear,
   a second planetary gear set including a second sun gear, a second planet carrier carrying a second set of planetary gears, and a second ring gear, said second sun gear rotating with said first auxiliary shaft and thereby connected by said pinion gear to said first ring gear,
   a first hydraulic motor-pump unit having a plurality of pistons and a first swash plate and rotating with said first auxiliary shaft and thereby operatively connected to said first ring gear,
   means for controlling said first swash plate to place said first hydraulic unit into operation selectively as a motor, as a pump, and as neither,
   a second auxiliary shaft having a gear mounted thereon in engagement with said second ring gear,
   a second hydraulic motor-pump unit having a plurality of pistons and a second swash plate and rotating with said second auxiliary shaft,
   means for controlling said second swash plate to place said second hydraulic unit into operation selectively as a motor, as a pump, and as neither,
   a pair of conduits connecting said first and second motor-pump units together,
   a first additional gear mounted on said input shaft, and
   a second additional gear mounted on said second carrier and in engagement with said first additional gear.

10. The transmission of claim 9 wherein said first hydraulic unit is supplemented by an auxiliary hydraulic unit having a swash plate controlled by the same means as that controlling said first swash plate and driven from said first auxiliary shaft through an overrunning clutch.

11. The transmission of claim 9 wherein said second hydraulic unit is supplemented by an auxiliary hydraulic unit having a swash plate controlled by the same means as that controlling said second swash plate and driven from said second auxiliary shaft through an overrunning clutch.

12. The transmission of claim 9 having both said means for controlling included in a single system having means for varying continuously from a first mode wherein said second hydraulic unit is inoperative, to a second mode wherein said first hydraulic unit is operated as a motor and said second hydraulic unit is operated as a pump, to a third mode where said first hydraulic unit is inoperative.

13. The transmission of claim 12 wherein in said first and second modes said clutch means is disengaged and in said third mode said clutch means is engaged.

14. A split-torque transmission including in combination
   an input shaft,
   an output shaft,
   a first planetary gear set including a first sun gear rotated by said input shaft, a first planet carrier carrying a first set of planet gears and rotating with said output shaft, and a first ring gear,
   first clutch means for engaging and disengaging said input shaft and said planet carrier to provide, during such engagement, direct drive of said output shaft by said input shaft,
   a first auxiliary shaft having a pinion gear secured thereto and engaged with said first ring gear,
   a second planetary gear set including a second sun gear rotating with said first auxiliary shaft and thereby operatively connected to said first ring gear, a second planet carrier carrying a second set of planetary gears, and a second ring gear,
   a first hydraulic motor-pump unit having a plurality of pistons and a first swash plate and rotating with said first auxiliary shaft and thereby operatively connected to said first ring gear through said pinion gear,
   first control means for controlling said first swash plate to place said first hydraulic unit into operation selectively as a motor, as a pump, and as neither,
   a second auxiliary shaft having a gear mounted thereon in engagement with said second ring gear,
   a third auxiliary shaft in line with said second auxiliary shaft and having a pinion gear thereon,
   second clutch means for engaging and disengaging said second and third auxiliary shafts,
   a second hydraulic motor-pump unit having a plurality of pistons and a second swash plate and driven by said third auxiliary shaft,
   second control means for controlling said second swash plate to place said second hydraulic unit into operation selectively as a motor, as a pump, and as neither,
   a pair of conduits connecting said motor pump units together,
   a first additional gear mounted on said input shaft,
   a second additional gear mounted on said second planet carrier and in engagement with said first additional gear,
   a third additional gear freely mounted on said output shaft and in engagement with said pinion gear, and
   third clutch means for locking said third additional gear to said output shaft and for unlocking it therefrom.

15. The transmission of claim 14 wherein said first and second control means are linked together for continuous movement through four modes from starting to high speeds, wherein (1) in a first mode the first hydraulic unit is operated as a pump and said second hydraulic unit is operated as a motor, (2) in a second mode the second hydraulic unit is rendered inoperative and the transmission is solely mechanical, (3) in a third mode the first hydraulic unit is operated as a motor and the second hydraulic unit is operated as a pump, and (4) in a fourth mode the first hydraulic unit is rendered inoperative, and the transmission is solely mechanical.

16. The transmission of claim 15 wherein a single device controls said first and second control means and said clutches and includes means for disengaging said first and second clutch and engaging said third clutch in said first and second modes, for engaging said second clutch and disengaging said first and third clutch in said third mode, and, in said fourth mode, for engaging said first and second clutch and disengaging said third clutch.

17. The transmission of claim 14 wherein there is an auxiliary motor-pump unit in parallel with said first hydraulic unit and controlled by said first control means to be in the same mode as said first hydraulic unit, and driven by said first auxiliary shaft through an overrunning clutch.

18. The transmission of claim 14 wherein there is an auxiliary motor-pump unit in parallel with said second hydraulic unit and controlled by said second control means to be in the same mode as said second hydraulic unit, and driven by said third auxiliary shaft through an overrunning clutch.

19. A split-torque transmission for use with an input shaft and an output shaft, including in combination
   a first planetary gear set including a first sun gear rotated by said input shaft, a first planetary carrier carrying a first set of planet gears and rotating with said output shaft, and a ring gear, a first auxiliary shaft driven by said input shaft, a second planetary gear set including a second sun gear and a second planet carrier carrying a second set of planetary gears, said second sun gear rotating with said first auxiliary shaft, said second set of planetary gears also being meshed with said ring gear, a second auxiliary shaft having thereon a pinion gear engaging said ring gear, a first hydraulic motor-pump unit having a plurality of pistons and a first swash plate and rotating with said second auxiliary shaft and thereby operatively connected to said ring gear, means for controlling said first swash plate to place said first hydraulic unit into operation selectively as a motor, as a pump, and as neither, a third auxiliary shaft having a gear mounted thereon in geared engagement with said second planetary carrier, a second hydraulic motor-pump unit having a plurality of pistons and a second swash plate and rotating with said third auxiliary shaft, means for controlling said second swash plate to place said second hydraulic unit into operation selectively as a motor, as a pump, and as neither, and a pair of conduits connecting said first and second motor-pump units together.

20. The transmission of claim 19 wherein the driving connection between said input shaft and said first auxiliary shaft comprises a first additional gear mounted on said input shaft, a second additional gear mounted on said first auxiliary shaft, a third additional gear in engagement with said first additional gear, and a fourth additional gear in engagement with said third and second additional gears.

21. The transmission of claim 19 wherein said first auxiliary shaft is a tubular shaft coaxial with said input shaft, so that said first and second planetary sets are coaxial.

22. The transmission of claim 19 having both said means for controlling included in a single system having means for varying continuously from a first mode wherein said second hydraulic unit is inoperative, to a second mode wherein said first hydraulic unit is operated as a motor and said second hydraulic unit is operated as a pump, to a third mode where said first hydraulic unit is inoperative.

23. A split-torque transmission including in combination an input shaft, an output shaft, a first planetary gear set including a first sun gear rotated by said input shaft, a first planet carrier carrying a first set of planet gears and rotating with said output shaft, and a ring gear, clutch means for engaging and disengaging said input shaft and said first planet carrier and therefore providing, during such engagement, direct drive of said output shaft by said input shaft, a first auxiliary shaft driven by said input shaft, a second planetary gear set including a second sun gear and a second planet carrier carrying a second set of planetary gears, said second sun gear rotating with said first auxiliary shaft, said second set of planetary gears also being meshed with said ring gear, a second auxiliary shaft having thereon a pinion gear engaging said ring gear, a first hydraulic motor-pump unit having a plurality of pistons and a first swash plate and rotating with said second auxiliary shaft and thereby operatively connected to said ring gear, means for controlling said first swash plate to place said first hydraulic unit into operation selectively as a motor, as a pump, and as neither, a third auxiliary shaft having a gear mounted thereon in geared engagement with said second planetary carrier, a second hydraulic motor-pump unit having a plurality of pistons and a second swash plate and rotating with said third auxiliary shaft, means for controlling said second swash plate to place said second hydraulic unit into operation selectively as a motor, as a pump, and as neither, and a pair of conduits connecting said first and second motor-pump units together.

24. The transmission of claim 23 having both said means for controlling included in a single system having means for varying continuously from a first mode wherein said second hydraulic unit is inoperative, to a second mode wherein said first hydraulic unit is operated as a motor and said second hydraulic unit is operated as a pump, to a third mode where said first hydraulic unit is inoperative.

25. The transmission of claim 12 wherein in said first and second modes said clutch means is disengaged and in said third mode said clutch means is engaged.

26. A split-torque transmission including in combination an input shaft, an output shaft, a first auxiliary shaft coaxial with and surrounding said input shaft, a first planetary gear set including a first sun gear rotated by said input shaft, a first planet carrier carrying a first set of planet gears and rotating with said output shaft, and a ring gear, first clutch means for engaging and disengaging said input shaft and said planet carrier to provide, during such engagement, direct drive of said output shaft by said input shaft, a second planetary gear set including a second sun gear rotating with said first auxiliary shaft and a second planet carrier carrying a second set of planetary gears meshed with said ring gear, a second auxiliary shaft having a pinion gear secured thereto and engaged with said ring gear, a first hydraulic motor-pump unit having a plurality of pistons and a first swash plate and rotating with said second auxiliary shaft and thereby operatively connected to said ring gear, first control means for controlling said first swash plate to place said first hydraulic unit into operation selectively as a motor, as a pump, and as neither, a third auxiliary shaft having a gear mounted thereon in geared engagement with said second planetary carrier, a fourth auxiliary shaft in line with said third auxiliary shaft, second clutch means for engaging and disengaging said third and fourth auxiliary shafts, a second hydraulic motor-pump unit having a plurality of pistons and a second swash plate and driven by said fourth auxiliary shaft, second control means for controlling said second swash plate to place said second hydraulic unit into operation selectively as a motor, as a pump, and as neither, a pair of conduits connecting said motor pump units together, a fifth auxiliary shaft in line with said fourth auxiliary shaft and having a second pinion gear thereon, an additional gear freely mounted on said output shaft, a second additional gear in engagement with said second pinion gear, and said additional gear, and third clutch means for locking said fifth auxiliary shaft to said fourth auxiliary shaft and for unlocking it therefrom.

27. The transmission of claim 14 wherein said first and second control means are linked together for continuous movement through four modes from starting to high speeds, wherein (1) in a first mode the first hydraulic unit is operated as a pump and said second hydraulic unit is operated as a motor, (2) in a second mode the second hydraulic unit is rendered inoperative and the transmission is solely mechanical, (3) in a third mode the first hydraulic unit is operated as a motor and the second hydraulic unit is operated as a pump, and (4) in a fourth mode the first hydraulic unit is rendered inoperative, and the transmission is solely mechanical.

28. The transmission of claim 26 wherein a single device controls said first and second control means and said clutches and includes means for disengaging said first and second clutch and engaging said third clutch in said first and second modes, for engaging said second clutch and disengaging said first and third clutch in said third mode, and, in said fourth mode, for engaging said first and second clutch and disengaging said third clutch.

References Cited
UNITED STATES PATENTS

| | | | |
|---|---|---|---|
| 2,808,737 | 10/1957 | Bullard | 74—687 |
| 2,830,468 | 4/1958 | Waring | 74—687 |
| 2,931,250 | 4/1960 | Ebert | 74—687 |
| 3,286,543 | 11/1966 | Porter | 74—687 X |
| 3,300,000 | 1/1967 | Stoyke. | |

ARTHUR T. McKEON, *Primary Examiner.*